April 2, 1940.  E. H. LANGE  2,196,117
FISH GRAPPLE
Filed Sept. 2, 1938
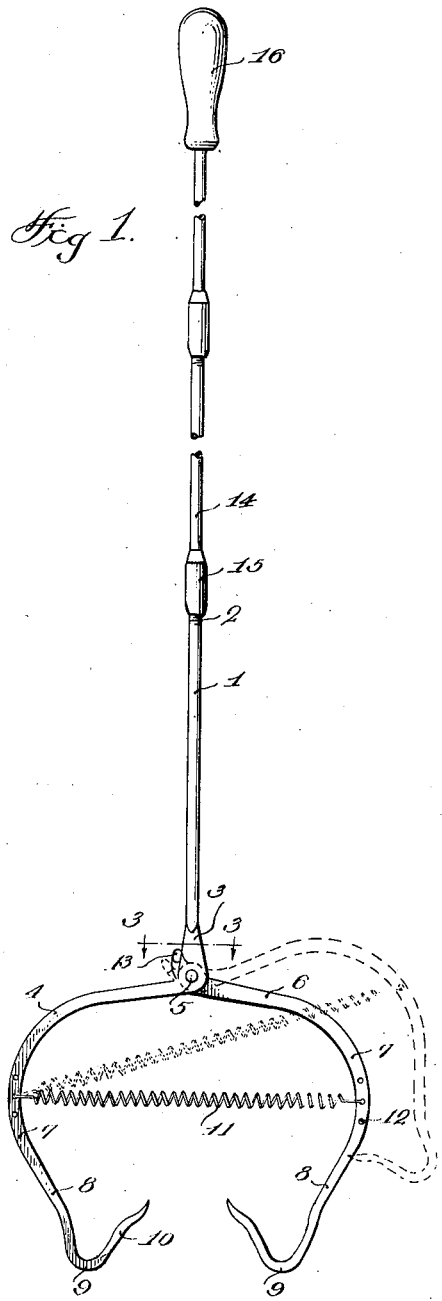
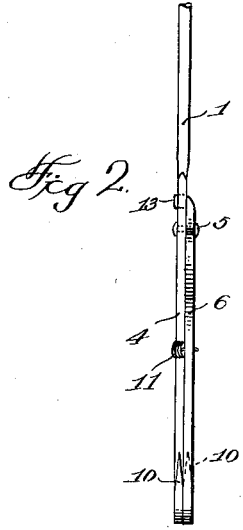
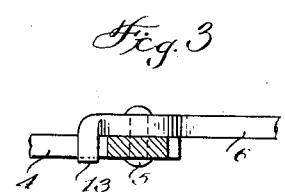
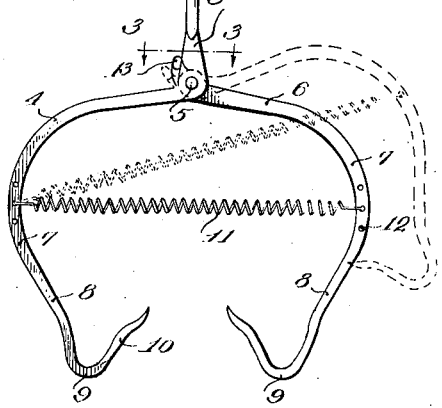
Emil H. Lange
INVENTOR
BY Victor J. Evans & Co.
ATTORNEYS Patented Apr. 2, 1940

2,196,117

UNITED STATES PATENT OFFICE 2,196,117

FISH GRAPPLE

Emil H. Lange, Lemont, Ill.

Application September 2, 1938, Serial No. 228,246

1 Claim. (Cl. 43—5)

This invention relates to fish grapples, and its general object is to provide a grapple that is primarily designed for landing game fish and the like in an easy and expeditious manner, with little or no chance of the fish escaping, as the grapple can be readily applied to the fish and the struggling of the fish automatically increases the penetrating action of the barbs of the grapple so that the barbs become firmly embedded within the fish yet can be manually removed therefrom with minimum effort on the part of the user.

A further object is to provide a fish grapple that includes jaws that are normally urged together, to bring about automatic penetrating action of the barbs, and one end of the jaws is integral with the shank while the other is pivotally associated therewith, the shank having detachably connected thereto a handle including detachably connected sections for varying the length of the handle.

Another object is to provide a fish grapple, that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side elevation of the grapple which forms the subject matter of the present invention.

Figure 2 is an edge elevation of the jawed end of the grapple.

Figure 3 is a sectional view taken approximately on line 3—3 of Figure 1, looking in the direction of the arrows.

Referring to the drawing in detail, the reference numeral 1 indicates the shank of my grapple which in the form as shown has a threaded outer end 2 and the opposite end is thickened or enlarged in flat formation as at 3. Formed on the flat enlarged portion 3 is a stationary jaw 4, and the enlarged flattened portion has an opening therein for receiving a pivot pin 5 for pivotally securing a movable jaw 6 thereto for cooperation with the stationary jaw.

The jaws 4 and 6 are identical in shape, and extend outwardly in opposite directions from the shank to provide inclined portions which merge into portions 7 that are curved toward each other and from the curved portion 7, the jaws extend inwardly toward each other at an inclination, as at 8. The free end portions of the jaws terminate in hooks 9 directed toward each other in converging relation and which in turn terminate into inwardly and upwardly flared curved penetrating prongs 10.

The movable jaw is urged toward the stationary jaw by a coil spring 11 that has its end convolutions connected to the jaws preferably at the curved portions 7 thereof and a number of openings 12 are provided in the jaws for adjustably associating the spring with respect thereto, as will be obvious upon inspection of Figure 1.

In order to limit the inward movement of the movable jaw, it will be noted as best shown in Figure 3, that the inner end of the movable jaw has formed thereon a right angle bent lug 13 having a flat inner surface for engagement with the enlarged flat portion of the shank, and it will be further noted from Figure 3 that the inner end portion through which passes the pivot pin 5 is flattened, to provide a relatively wide bearing surface engaged with the flat portion of the shank.

Threadedly secured to the outer end of the shank 1 is a handle that is made up of a plurality of sections 14, each of which has an interiorly threaded socket joint member 15, and secured to the outermost section is a knob 16 providing a hand gripping means. Any number of sections 14 may be used, and the provision thereof makes it possible to vary the length of the handle, as will be apparent.

From the above description and disclosure of the drawing, it will be obvious that I have provided a fish grapple that can be readily applied to a fish or the like, merely by disposing the inner portions of the hooks 9 about the fish, and as the hooked portions are inclined toward each other, they provide cam surfaces which when engaged with the fish causes the jaws to be opened against the action of the spring 11, and reverse movement of the grapple will result in the penetrating prongs becoming embedded within the fish, as will be apparent upon inspection of Figure 1. In view of the fact that the coil spring urges the jaws together, it will be further obvious that the struggling of the fish automatically increases the penetrating action of the barbs.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A fish grapple comprising a shank, a stationary jaw formed on the shank, a movable jaw, a pivot pin pivotally securing the movable jaw to the shank at the juncture of the stationary jaw with the shank, said jaws including opposed portions diverging from their juncture with the shank, inwardly curved portions extending from the diverging portions, inwardly inclined portions extending from the inwardly curved portions, hooks on the free ends of the inwardly inclined portions and directed toward each other in converging relation, said hooks terminating into inwardly and upwardly flared curved penetrating prongs, a coil spring bridging and connected to the inwardly curved portions for urging the movable jaw toward the stationary jaw, a terminal lug at the pivoted end of the movable jaw, and the lug being disposed substantially parallel to the pivot pin for engagement with the shank to limit the inward movement of the movable jaw, and a handle secured to the shank.

EMIL H. LANGE.